| United States Patent [19] | [11] Patent Number: 4,759,987 |
| Mizobe et al. | [45] Date of Patent: Jul. 26, 1988 |

[54] POLYIMIDE POWDER AND PROCESS FOR PRODUCING THE SAME

[75] Inventors: Keizo Mizobe; Koji Suzuki; Osamu Yoshikai; Yuzuru Noda, all of Osaka, Japan

[73] Assignee: Nitto Electric Industrial Co., Ltd., Osaka, Japan

[21] Appl. No.: 871,216

[22] Filed: Jun. 5, 1986

[30] Foreign Application Priority Data

Jun. 5, 1985 [JP] Japan ................. 60-122198

[51] Int. Cl.$^4$ ...................... B32B 27/34; B32B 27/20; B05D 7/00
[52] U.S. Cl. ..................................... 428/395; 427/216; 427/221; 428/404; 428/406; 428/407; 524/205
[58] Field of Search ................. 427/221, 216; 428/395, 428/407, 404, 406; 524/205

[56] References Cited

U.S. PATENT DOCUMENTS 4,640,944  2/1987  Brooks ................................. 523/205

FOREIGN PATENT DOCUMENTS 39-22196  10/1964  Japan .

*Primary Examiner*—Lewis T. Jacobs
*Attorney, Agent, or Firm*—Sughrue, Mion, Zinn, Macpeak & Seas

[57] ABSTRACT

A polyimide molding powder and a process for producing the same are disclosed, said powder comprising an aggregate of polyimide particles, in which the whole or a large portion of said powder comprises polyimide particles composed of a particulate filler coated with a polyimide resin and/or polyimide particles composed of a fibrous filler coated with a polyimide resin, and said process comprising reacting an aromatic tetracarboxylic acid dianhydride and an aromatic diamino compound in an organic solvent to synthesize a polyimide precursor and imidating the polyimide precursor to precipitate polyimide particles, wherein a particulate filler and/or a fibrous filler dispersed in a prescribed amount of an organic solvent is or are added to the reaction system at any stage before the imidation of the polyimide precursor. The molding powder produces polyimide molded products free from brittleness and excellent in appearance, as well as various performance characteristics due to the improving effects of the filler.

9 Claims, 2 Drawing Sheets

POLYIMIDE POWDER AND PROCESS FOR PRODUCING THE SAME

FIELD OF THE INVENTION

This invention relates to a polyimide powder which can be compression-molded under heating into a polyimide molded article.

BACKGROUND OF THE INVENTION

A polyimide powder for heat compression molding is produced by reacting an aromatic tetracarboxylic acid dianhydride with an aromatic diamino compound in an organic polar solvent to form a polyamide acid, which is then imidated to precipitate polyimide particles. The resulting polyimide powder may be used, for example, as a molding material or may be mixed with a filler to impart strength characteristics to molded products. In the latter case in which a polyimide powder and a filler are mixed to obtain a polyimide molding powder, a polyimide powder and a filler powder are dry blended in a mixer, etc., or each powder is separately dispersed in a dispersing medium and the dispersions are mixed, followed by removal of the dispersing medium (wet blending). According to these methods, the polyimide powder and filler can uniformly be mixed, but the resulting mixed powder is a mere mechanical mixture of the polyimide powder and the filler. However, since a polyimide powder itself is substantially infusible or insoluble, it does not sufficiently flow in the heat compression molding, particularly due to interference from the filler powder. As a result, molded products obtained from such a molding powder is extremely brittle. Moreover, they have a seriously poor appearance as not only lacking gloss but also having cracks or spots due to non-uniform distribution of the polyimide powder on their surface.

Japanese Patent Publication No. 22196/64 discloses a process for preparing a polyimide molding powder by suspending a fine metal powder or a metal oxide, etc. directly in a polyamide acid solution. However, this process produces a large-sized polyimide powder composed of a filler aggregate coated with a polyimide, from which only a very brittle molded product can be obtained. In other words, since the filler aggregate that is a mere assembly of particles is first subjected to destruction upon application of external force, the molded products are exceedingly brittle and thus have a small strength.

Under these circumstances, the conventional polyimide molding powders containing a filler can produce no more than brittle molded products having poor appearance with no gloss. Nevertheless, it is inconceivable to exclude the filler, taking into account the excellent characteristics imparted to polyimide molded products by the filler. It has been, therefore, keenly demanded to improve flowability of a polyimide molding powder containing a filler during the molding.

SUMMARY OF THE INVENTION

In the light of the above-described circumstances, an object of this invention is to provide a polyimide powder having improved flowability during molding and a process for producing the same.

The above object can be accomplished by a polyimide powder comprising an aggregate of polyimide particles, in which the whole or major part of said polyimide powder comprises polyimide particles comprising a particulate filler coated with a polyimide resin and/or polyimide particles comprising a fibrous filler coated with a polyimide resin, and by a process for producing a polyimide powder comprising reacting an aromatic tetracarboxylic acid dianhydride and an aromatic diamino compound in an organic solvent to synthesize a polyimide precursor and imidating the polyimide precursor to precipitate polyimide particles, wherein a particulate filler and/or a fibrous filler dispersed in a prescribed amount of an organic solvent is/are added to the production system before the synthesis of the polyimide precursor through the imidation of the polyimide precursor. The term "coated" as herein used means not only "to be entirely coated" but "to be partly coated".

In order to improve flowability of a resin material during molding of a polyimide powder containing a filler, the present inventors have extensively studied on the shape and structure of polyimide particles constituting the polyimide powder. As a result, it has now been found that the above-described problems can never be solved as far as the polyimide particles and the filler are merely mixed even with high uniformity and that improvement in flowability of the resin material can first be realized by a composite structure, in which a filler in a fine particle or fiber form is coated with a polyimide resin. It has also been found that powders having such composite structure can be obtained by adding a particulate or fibrous filler not as such but in the state that the filler is dispersed in a prescribed amount of an organic solvent at an appropriate stage of from before the synthesis of a polyimide precursor through the imidation of the polyimide precursor. The present invention has been completed based on these findings.

BRIEF DESCRIPTION OF THE ACCOMPANYING DRAWINGS

Figure 2:
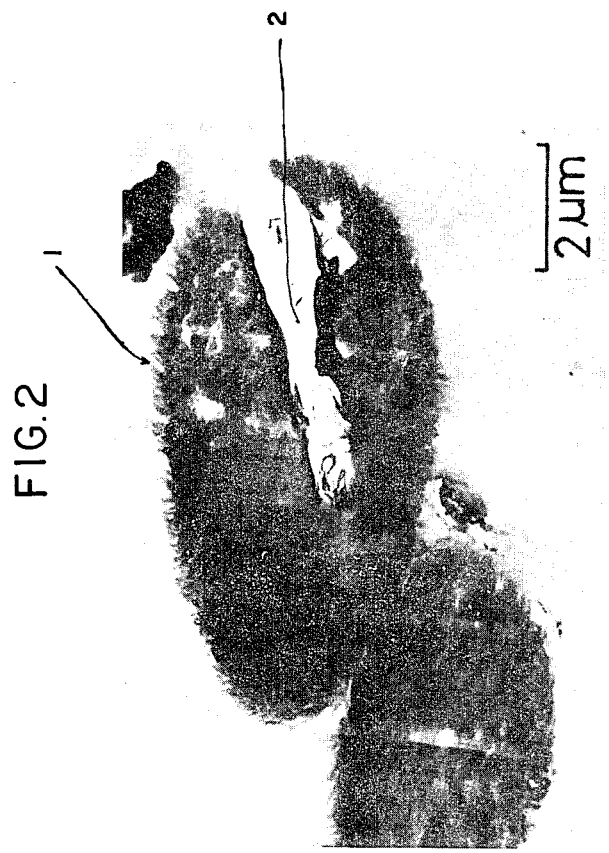
FIG. 2 is a transmission electron photomicrograph of the cross-section of the polyimide particle of FIG. 1 at 10,000 magnifications.

In FIGS. 1 to 4, the numerals 1 and 2 indicate polyimide particles and fillers, respectively.

DETAILED DESCRIPTION OF THE INVENTION

The polyimide powder according to the present invention can be produced by reacting an acid dianhydride, such as aromatic tetracarboxylic acid dianhydrides, with a diamino compound, such as aromatic diamino compounds, in an organic solvent to synthesize a polyimide precursor and adding a particulate filler and/or a fibrous filler uniformly dispersed in an organic solvent to the production system at an appropriate stage from before the synthesis of the polyimide precursor through the imidation of the polyimide precursor.

Typical examples of the acid dianhydrides, e.g., aromatic tetracarboxylic acid dianhydrides, which can be used in the present invention include pyromellitic dianhydride, 3,3',4,4'-biphenyltetracarboxylic dianhydride, 2,3,3',4'-biphenyltetracarboxylic dianhydride, 2,3,6,7- naphthalenetetracarboxylic dianhydride, 1,2,4,5-naphthalenetetracarboxylic dianhydride, 3,3',4,4'-benzophenonetetracarboxylic dianhydride, 2,2-bis[4-(2,3-dicarboxyphenoxy)phenyl]-propane dianhydride, 4,4'-bis(2,3-dicarboxyphenoxy)diphenyl ether dianhydride, and oxides, lower alkyl esters, polyhydric alcohol esters, etc. of these dianhydrides. These compounds may be used either individually or in combination of two or more thereof. In addition to these aromatic carboxylic acid dianhydrides, aliphatic ones, such as 1,2,3,4-butanetetracarboxylic acid dianhydride and its derivatives, can also be used alone or in combination with the above-enumerated aromatic ones.

The diamino compound which is reacted with the acid dianhydride includes, for example, diphenyl ether type diamines, e.g., 4,4'-diaminodiphenyl ether, 3,3'-dimethyl-4,4'-diaminodiphenyl ether, 3,3'-dimethoxy-4,4'-diaminodiphenyl ether, 3,3'-diaminodiphenyl ether, 3,4'-diaminodiphenyl ether, etc.; diphenyl thioether type diamines, e.g., 4,4'-diaminodiphenyl thioether, 3,3'-dimethyl-4,4'-diaminodiphenyl thioether, 3,3'-dimethoxy-4,4'-diaminodiphenyl thioether, 3,3'-diaminodiphenyl thioether, etc.; benzophenone type diamines, e.g., 4,4'-diaminobenzophenone, 3,3'-dimethyl-4,4'-diaminobenzophenone, 3,3'-diaminobenzophenone, etc.; diphenylmethane type diamines, e.g., 3,3'-diaminodiphenylmethane, 4,4'-diaminodiphenylmethane, 3,3'-dimethyl-4,4'-diaminodiphenylmethane, etc.; bisphenylpropane type diamines, e.g., 2,2'-bis(4-aminophenyl)propane, 2,2'-bis(3-aminophenyl)propane, etc.; diphenyl sulfoxide type diamines, e.g., 4,4'-diaminodiphenyl sulfoxide, 3,3'-diaminodiphenyl sulfoxide, etc.; diphenyl sulfone type diamines, e.g., 4,4'-diaminodiphenylsulfone, 3,3'-diaminodiphenylsulfone, etc.; biphenyl type diamines, e.g., benzidine, 3,3'-dimethylbenzidine, 3,3'-dimethoxybenzidine, 3,3'-diaminobiphenyl, etc.; pyridine type diamines, e.g., 2,6-diaminopyridine, 2,5-diaminopyridine, 3,4-diaminopyridine, etc.; o-, m- or p-diaminobenzene, 3,5-diaminobenzoic acid, 4,4'-di(m-aminophenoxy)diphenylsulfone, 4,4'-di(p-aminophenoxy)diphenylsulfone, 4,4'-di(m-aminophenoxy)-diphenyl ether, 4,4'-di(p-aminophenoxy)diphenyl ether, 4,4'-di(m-aminophenoxy)diphenylpropane, 4,4'-di(p-aminophenoxy)diphenylpropane, 4,4'-di(m-aminophenylsulfonyl)diphenyl ether, 4,4'-di(p-aminophenylsulfonyl)diphenyl ether, 4,4'-di(m-aminophenyl thioether)diphenyl sulfide, 4,4'-di(p-aminophenyl thioether)diphenyl sulfide, 4,4'-di(m-aminophenoxy)diphenyl ketone, 4,4'-di(p-aminophenoxy)diphenyl ketone, 4,4'-di(m-aminophenoxy)diphenylmethane, 4,4'-di(p-aminophenoxy)diphenylmethane, 2,5-diaminotoluene, 2,4-diaminoxylene, diaminodurene, 1,5-diaminonapthalene, 2,6-diaminonapthalene, and the like. These diamino compounds may be used either individually or in combination of two or more thereof. Further, a part of the above-described aromatic diamino compound may be replaced with an aliphatic diamino compound.

The organic solvent for polymerization of the diamino compound and the acid dianhydride includes organic polar solvents, such as N-methyl-2-pyrrolidone, dimethylacetamide, dimethylformamide, dimethyl sulfoxide, hexamethylenephosphortriamide, pyridine, etc., and phenols, such as cresol, phenol, xylenol, etc. If desired, these organic solvents may be used in combination with a commonly employed solvent, such as hexane, benzene, toluene, xylene, alcohols, etc.

The organic solvent which can be used for uniformly dispersing a particulate filler and/or a fibrous filler, which is added to the production system before the synthesis of a polyimide precursor through the imidation of the polyimide precursor, is usually the same as used for the polymerization of the acid dianhydride and the diamino compound. It is the greatest characteristic of the present invention that the particulate or fibrous filler should be added not as such but in the state that the filler is sufficiently dispersed in a prescribed amount of such organic solvent.

Addition of the filler in a dispersed state in an organic solvent brings about favorable results, probably because the filler previously wetted with the organic solvent can be uniformly dispersed in the reaction system to form nuclei around which a polyimide is precipitated. The process described in Japanese Patent Publication No. 22196/64 comprises suspending a fine metal powder or a metal oxide, etc. directly in a polyamide acid solution to produce a polyimide molding powder. Since such a fine metal powder, etc. is in an aggregated state and, when directly added to a polyamide acid solution, still remains aggregated, a polyimide does not precipitate using the individual metal powder as a nucleus, thus failing to form a composite structure as obtained in the present invention. As mentioned above, this known process only produces a large-sized polyimide powder comprising a fine metal powder in an aggregated state having a polyimide coating, that can produce nothing but brittle molded articles.

In cases when use of the above-described organic solvent alone is insufficient for wetting the filler, it is preferable that the filler is before-hand wetted with an aliphatic lower alcohol, e.g., methanol, ethanol, propanol, isopropanol, etc., an aliphatic ketone, e.g., acetone, methyl ethyl ketone, methyl isobutyl ketone, etc., or a petroleum naphtha, e.g., benzene, hexane, toluene, xylene, etc. prior to the dispersion in the organic solvent. It is possible to disperse the filler in a mixture of the above-described aliphatic lower alcohol, aliphatic ketone or petroleum naphtha and the aforesaid polymerization solvent. Further, surface active agents and finishing agents, e.g., silane coupling agents, aluminum coupling agents, titanium coupling agents, etc., may also be employed. Uniform dispersion of the filler in the organic solvent can be carried out by using a dispersing device, e.g. a ball mill, a sand mill, attritor, a three-roll mill, a bead mill, a jet mill, a vibration mill, a disper, an impeller mill, a flow jet mixer, a homogenizer, a colloid mill, etc., or a general stirrer, e.g., agitator, etc.

The filler which can be used in the present invention includes various kinds, such as those imparting high strength properties to polyimide molded products, e.g., glass fibers, carbon fibers, ceramic fibers, boron fibers, glass beads, whiskers, diamond powders, etc.; those imparting heat dissipation properties to polyimide molded products, e.g., alumina, silica, etc.; those imparting corona resistance, e.g., natural mica, synthetic mica, alumina, etc.; those imparting electric conductivity, e.g., carbon black, a silver powder, a copper powder, an aluminum powder, a nickel powder, etc.; and those imparting heat resistance to polyimide molded products, e.g., aramide fibers, metal fibers, ceramic fibers, whiskers, silicon carbide, silicon oxide, alumina, a magnesium powder, a titanium powder, a polyimide powder, etc. In addition, a fluorine-containing fine powder may be used in order to reduce a coefficient of friction. These fillers may be used individually or in combination of two or more thereof. These fillers constitute a core of the polyimide composite powder. In particular, the particulate filler preferably has a mean particle diameter of not more than 1 μm and a bulk density of not more than 0.15 g/cc, and the fibrous filler preferably has a mean length of not more than 300 μm and a bulk density of from 0.01 to 0.5 g/cc. The amount of the filler to be used can appropriately be determined depending on characteristics required for the polyimide molded products, and usually ranges from 1 to 50% by weight based on the polyimide composite powder.

The polyimide composite powder of the present invention, in which the above-described particulate or fibrous filler is coated with a polyimide resin, can be produced by the process according to the present invention with an extremely high efficiency. This process has been established through the developments and studies on the polyimide composite powder, and is characterized in that the fine filler is not added directly to the reaction system but is uniformly dispersed in an organic solvent in advance and then added to the system. Thus, the filler can uniformly be dispersed in the reaction system, and a polyimide particle is precipitated around the dispersed filler nucleus, as described above. The addition of the organic solvent having uniformly dispersed therein the fine filler can be effected at any stage before commencement of imidation of the polyimide precursor, i.e., before precipitation of a polyimide powder. For example, the uniform filler dispersion can be added before addition of the acid dianhydride, e.g., aromatic tetracarboxylic acid dianhydride, or the diamino compound, e.g., aromatic diamino compounds, or it may be added to the polyimide precursor solution prior to imidation.

More specifically, an aromatic tetracarboxylic acid dianhydride substantially equimolar amount of an aromatic diamino compound are dissolved in an organic solvent at a temperature of 150° C. or lower, and the solution is adjusted so as to have a viscosity of not more than 50 poises (by rotational viscometer, hereinafter the same), and preferably not more than 10 poises. To the resulting solution is added a organic solvent having uniformly dispersed therein a filler, followed by temperature elevation to 160° to 200° C. to cause polymerization, whereby a polyimide particle is precipitated around the filler as a nucleus. In this case, the monomer concentration ranges from 5 to 50% by weight, and preferably from 10 to 30% by weight. The reaction mixture is then cooled and filtered. The collected polyimide particles are washed and dried in a known manner to obtain the desired polyimide powder. In the above reaction, use of a small amount of a tertiary amine as a catalyst for imidation accelerates the imidation reaction and thereby realizes reduction of the overall reaction time.

The whole or a large portion of the thus prepared polyimide powder comprises polyimide particles of such composite structure wherein the fine particulate or fibrous filler is coated with a polyimide resin. Such a polyimide powder can produce polyimide molded products excellent in gloss and appearance and free from brittleness because of excellent flowability of the resin material during compression molding under heating. The term "a major portion or a large portion" as herein used means about 90% or more based on a given unit number, that can be determined by a scanning electron photomicrograph. The polyimide molding powder may contain a mere mixture of polyimide particles and filler so long as the polyimide powder having the above-described composite structure occupies 90% or more.

Favorable results can be expected from application of the polyimide molding powder to molding of various parts requiring heat resistance, mechanical strength, dimensional stability, abrasion resistance, and the like, such as heat-sensitive sliding parts of copying machines, facsimiles, printers, etc., bearing members for sliding of compresser, etc., and so on.

As described above, the polyimide powder in accordance with the present invention comprises wholly or for the large portion polyimide particles having such composite structure wherein a filler is coated with a polyimide resin. In other words, the filler which disturbs flow of the polyimide particles is incorporated in the interior of the individual polyimide particles and does not exist among the polyimide particles. Therefore, the polyimide particles are directly fused to each other upon application of heat for molding, showing fairly good flowability. Hence, the resulting polyimide molded products having uniformly distributed therethrough the polyimide resinous material are free from brittleness attributed to non-uniform distribution of the resin material and have excellent gloss as a whole as well as greatly improved performance characteristics due to the improving effects of the filler. Besides, the process according to the present invention makes it possible to produce such excellent polyimide molding powder with high efficiency.

This invention will now be illustrated in greater detail by reference to the following examples, but it should be understood that the present invention is not limited thereto.

EXAMPLE 1

In a 5,000 ml-volume four-necked flask were charged 294 g (1 mol) of 3,3′,4,4′-biphenyltetracarboxylic dianhydride and 200 g (1 mol) of 4,4′-diaminodiphenyl ether, and a graphite dispersion prepared by dispersing 80.8 g of graphite having a mean particle diameter of 1 μm in 2,799 g of N-methyl-2-pyrrolidone in a ball mill was added thereto with stirring while heating the system to completely dissolve the monomers. The heating was continued at an elevated temperature. When the temperature reached a range of from 170° to 175° C., water by-produced by dehydration cyclization of a polyamide acid began to distill to cause sudden turbidity and polyimide particles were precipitated using the graphite as a nucleus to form a slurry. Thereafter, the temperature was further elevated up to 190° C., and the polymerization reaction was continued for an additional 2 hours. After completion of the polymerization reaction, the reaction mixture was cooled and filtered to collect a polyimide composite powder comprising the graphite particle coated with the polyimide resin. The resulting powder was washed twice with N-methyl-2-pyrrolidone and then twice with acetone, followed by dring at 250° C. for 3 hours to obtain 529 g (yield: 98.2%) of the desired polyimide composite powder.

EXAMPLE 2

In 1,976 g of N-methyl-2-pyrrolidone was dissolved 200 g (1 mol) of 4,4′-diaminodiphenyl ether, and 294 g (1 mol) of 3,3′,4,4′-biphenyltetracarboxylic dianhydride was slowly added to the solution while stirring to effect reaction at 30° C. for 2 hours. There was synthesized a polyamide acid, and the viscosity of the solution increased to 20,000 poises. The temperature of the solution was gradually raised. When it reached 120° to 150° C. at which the viscosity became 5 poises, a filler dispersion prepared by dispersing 50.9 g of a polytetrafluoroethylene powder having a particle size of 0.5 μm in isopropyl alcohol for wetting and then dispersing the powder in 823 g of N-methyl-2-pyrrolidone was added to the polymerization reaction mixture. The heating was continued, and then the isopropyl alcohol began to be distilled. At a temperature of from 170° to 175° C., water by-produced by dehydration cyclization of the polyamide acid was distilled off to cause turbidity, and polyimide was precipitated using the polytetrafluoroethylene as a nucleus. The temperature was further elevated up to 190° C., and the polymerization reaction was allowed to continue for an additional 2 hours at that temperature. The reaction mixture was worked-up in the same manner as described in Example 1 to obtain 498 g (yield: 97.9%) of a polyimide composite powder.

EXAMPLE 3

In 2,799 g of N,N-dimethylacetamide was dispersed 80.8 g of boron nitrite having a mean particle diameter of 3.5 μm using a vibration mill. The resulting filler dispersion was placed in a 5,000 ml-volume flask, and a uniform powder mixture comprising 294 g (1 mol) of 3,3',4,4'-biphenyltetracarboxylic dianhydride and 200 g (1 mol) of 4,'-diaminodiphenyl ether was slowly added thereto. In concurrence with the addition of the mixed powder, the reaction mixture was heated. When the temperature reached 80° C., the monomers were completely dissolved. When the temperature was in the range of from 120° to 150° C., the viscosity of the reaction mixture fell to 10 poises or smaller. On continuation of the heating, the reaction mixture suddenly became turbid at a temperature of from 170° to 175° C., and water by-produced by dehydration cyclization of the polyamide acid began to distill and, at the same time, a polyimide began to precipitate in the form of slurry using the boron nitrite as a nucleus. The polymerization was allowed to continue for an additional 20 hours at that temperature. The reaction mixture was worked-up in the same manner as described in Example 1 to obtain 531 g (yield: 98.6%) of a polyimide composite powder.

EXAMPLE 4

In the same manner as in Example 1 but using 108 g (1 mol) of p-phenylenediamine in place of 4,4'-diaminodiphenyl ether and using 64.6 g of carbon fibers having a diameter of 7 μm and a length of 300 μm as a filler, 425 g (yield: 98.7%) of a polyimide composite powder was obtained.

EXAMPLE 5

In the same manner as in Example 1 but using 218 g (1 mol) of pyromellitic dianhydride in place of 3,3',4'4'-biphenyltetracarboxylic dianhydride and using 67.4 g of silicon carbide whiskers having a diameter of 0.5 μm and a length of 50 μm as a filler, 440 g (yield: 97.9%) of a polyimide composite powder was obtained.

EXAMPLE 6

In the same manner as in Example 1 but using 322 g (1 mol) of 3,3',4,4'-benzophenonetetracarboxylic dianhydride in place of 3,3',4,4'-biphenyltetracarboxylic dianhydride and using 85.8 g of alumina having a mean particle diameter of 0.5 μm as a filler, 558 g (yield: 97.6%) of a polyimide composite powder was obtained.

EXAMPLE 7

In the same manner as in Example 1 but using 196.3 g of carbon black having a mean diameter of 0.03 μm and a bulk specific gravity of 0.096 g/cc in place of graphite, 641 g (yield: 98.0%) of a polyimide composite powder having a bulk density of 0.22 g/cc was obtained.

EXAMPLE 8

In the same manner as in Example 1 but using 80.8 g of a copper powder having a mean diameter of 0.03 μm in place of graphite, 533 g (yield: 98.9%) of a polyimide composite powder was obtained.

COMPARATIVE EXAMPLE 1

In the same manner as in Example 1 except for using no filler, 450 g (yield: 98.2%) of a polyimide powder solely composed of polyimide throughout the individual particles was obtained. These polyimide particles had a spherical form, and a number of wrinkles were densely distributed on the outer surface thereof. The resulting polyimide powder had a bulk density of 0.45 g/cc.

COMPARATIVE EXAMPLE 2

The polyimide powder obtained in Comparative Example 1 (200 g) and 35.3 g of graphite were dry blended in a Honschel mixer to prepare a mixed powder.

Figure 1:
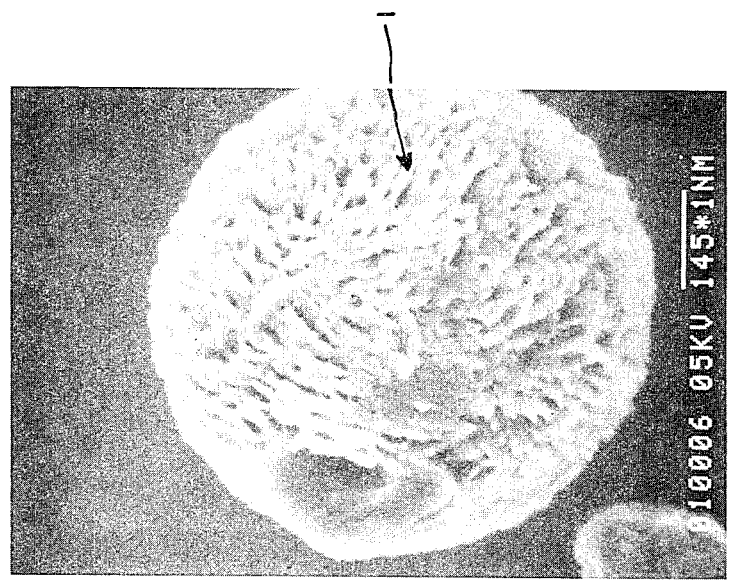
FIG. 1 is a scanning electron photomicrograph of the polyimide particle of Example 1 at 10,000 magnifications.
Figure 4:
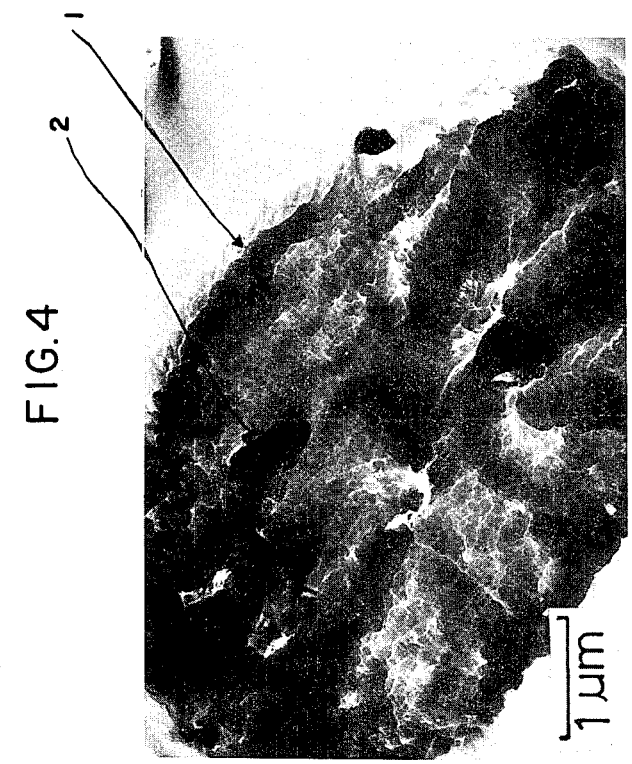
FIG. 4 is a transmission electron photomicrograph of the cross-section of FIG. 3 at 20,000 magnifications.
Figure 3:
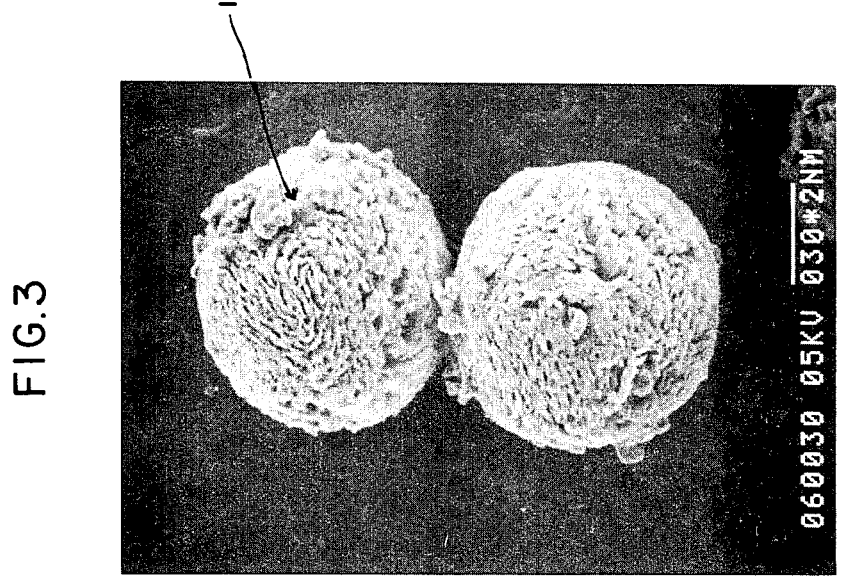
FIG. 3 is a scanning electron photomicrograph of the polyimide particles of Example 6 at 4,900 magnifications.

A scanning electron photomicrograph of the polyimide powder obtained in Example 1 (10,000 magnifications) and a transmission electron photomicrograph of the cross-section of the polyimide powder obtained in Example 1 (10,000 magnifications) are shown in FIGS. 1 and 2, respectively. A scanning electron photomicrograph of the polyimide powder obtained in Example 6 (4,900 magnifications) and a transmission electron photomicrograph of the cross-section of the polyimide powder obtained in Example 6 (20,000 magnifications) are shown in FIGS. 3 and 4, respectively. In these figures, the numerals 1 and 2 indicate the polyimide powder and the filler, respectively.

It can clearly be seen from FIGS. 1 to 4 that the polyimide powders obtained in Examples 1 and 6 have a composite structure, in which the filler is coated with the polyimide resin.

Each of the above obtained polyimide powders was compression molded at 400° C. under a compression pressure of 1,000 Kg/cm² for 30 min to form polyimide molded products. Physical characteristics of the resulting molded products are shown in Table 1 below.

TABLE 1

| Example No. | Tensile Strength (Kg/cm³) | Compression Stress (10% strain) (Kg/cm³) | Coefficient of Friction* | Coefficient of Linear Expansion (cm/cm/°C.) | Thermal Conductivity (Kcal/m/h/°C.) | Appearance |
|---|---|---|---|---|---|---|
| Ex. 1 | 730 | 1020 | 0.30 | — | — | good (with gloss on the whole surface) |

TABLE 1-continued

| Example No. | Tensile Strength (Kg/cm³) | Compression Stress (10% strain) (Kg/cm³) | Coefficient of Friction* | Coefficient of Linear Expansion (cm/cm/°C.) | Thermal Conductivity (Kcal/m/h/°C.) | Appearance |
|---|---|---|---|---|---|---|
| Ex. 2 | 540 | — | 0.25 | — | — | good (with gloss on the whole surface) |
| Ex. 3 | 650 | — | 0.25 | — | — | good (with gloss on the whole surface) |
| Ex. 4 | 910 | 1600 | not measured | $3.8 \times 10^{-5}$ | — | good (with gloss on the whole surface) |
| Ex. 5 | 980 | 1400 | — | — | — | good (with gloss on the whole surface) |
| Ex. 6 | 870 | — | — | — | 0.45 | good (with gloss on the whole surface) |
| Ex. 7 | 640 | 1600 | — | — | 1.340 | good (with gloss on the whole surface) |
| Ex. 8 | 970 | — | — | — | 1.30 | good (with gloss on the whole surface) |
| Comp. Ex. 1 | 980 | 990 | 0.35 | $6.4 \times 10^{-5}$ | 0.345 | good (with gloss on the whole surface) |
| Comp. Ex. 2 | 210 | — | 0.40 | — | — | poor (partly with dull surface) |

Note:
*PV Value: 10 Kg/cm³ · m/sec

As is apparent from the results of Table 1 above, the molded products obtained from the polyimide powder according to the present inention (Examples 1 to 8), in which the filler is coated with the polyimide resin, have improved characteristics, such as strength, heat resistance, and the like, due to the characteristics possessed by the filler per se and also good appearance. To the contrary, the molded product obtained from the polyimide powder of Comparative Example 1, in which the polyimide particles are composed solely of polyimide and contain no filler, exhibits only those characteristics possessed by a polyimide. It can further be seen that the molded product obtained from the powder of Comparative Example 2, in which the filler and the polyimide powder are merely mixed, shows an extremely deteriorated tensile strength due to insufficient flowability of the polyimide during molding and also has a poor appearance.

While the invention has been described in detail and with reference to specific embodiments thereof, it will be apparent to one skilled in the art that various changes and modifications can be made therein without departing from the spirit and scope thereof.

What is claimed is:

1. A polyimide powder comprising an aggregate of polyimide particles, in which the whole or a large portion of said polyimide powder comprises polyimide particles composed of a particulate filler coated with a polyimide resin and/or polyimide particles composed of a fibrous filler coated with a polyimide resin, wherein said particulate filler has a mean particle diameter of not more than 1 μm and a bulk density of not more than 0.15 g/cc, and wherein said firbous filler has a mean length of not more than 300 m and a bulk density of from 0.01 to 0.5 g/cc.

2. A process for producing a polyimide powder comprising reacting an aromatic tetracarboxylic acid dianhydride and an aromatic diamino compound in an organic solvent to synthesize a polyimide precursor and imidating the polyimide precursor to precipitate polyimide particles, wherein a particulate filler and/or a firbous filler is dispersed in an amount of an organic solvent which insures uniform dispersion of the particulate filler and/or the fibrous filler, whereafter the particulate filler and/or the fibrous filler is or are added to the reaction system so that the particulate filler and/or the fibrous filler is or are uniformly dispersed in the reaction system and said polyimide particle is precipitated around the dispersed filler, the adding of the particulate filler and/or the fibrous filler to the reaction system being at any stage before the synthesis of the polyimide precursor through the imidation of the polyimide precursor.

3. A process as in claim 2, wherein said particulate filler has a mean particle diameter of not more than 1 μm and a bulk density of not more than 0.15 g/cc.

4. A process as in claim 2, wherein said fibrous filler has a mean length of not more than 300 μm and a bulk density of from 0.01 to 0.5 g/cc.

5. A process as in claim 2, wherein the organic solvent used for synthesizing a polyimide precursor and the organic solvent for dispersing the filler are the same.

6. A process as in claim 5, wherein said organic solvent is a polar solvent or a phenolic solvent.

7. A process as in claim 6, wherein said polar solvent is N-methyl-2-pyrrolidone, dimethylacetamide, dimethylformamide, dimethyl sufoxide, hexamethylene-phosphortriamide or pyridine, and said phenolic solvent is cresol, phenol or xylenol.

8. A process as in claim 2, wherein the filler is previously wetted with an aliphatic lower alcohol, an aliphatic ketone or a petroleum naphtha before being dispersed in said organic solvent.

9. A process as in claim 2, wherein said organic solvent used for dispersing the filler is a mixture of a polar solvent or a phenolic solvent and an aliphatic lower alcohol, an aliphatic ketone or a petroleum naphtha.

* * * * *